United States Patent
Lin et al.

(10) Patent No.: US 11,139,701 B2
(45) Date of Patent: Oct. 5, 2021

(54) SYSTEMS, METHODS, AND DEVICES FOR WIRELESS CHARGING

(71) Applicant: Intel Corporation, Santa Clara, CA (US)

(72) Inventors: Xintian Lin, Palo Alto, CA (US); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/853,531

(22) Filed: Apr. 20, 2020

(65) Prior Publication Data

US 2021/0028650 A1    Jan. 28, 2021

Related U.S. Application Data

(63) Continuation of application No. 14/498,856, filed on Sep. 26, 2014, now Pat. No. 10,630,108.

(60) Provisional application No. 62/018,385, filed on Jun. 27, 2014.

(51) Int. Cl.
| | |
|---|---|
| *H02J 50/80* | (2016.01) |
| *H02J 50/40* | (2016.01) |
| *H02J 50/12* | (2016.01) |
| *H04B 5/00* | (2006.01) |

(52) U.S. Cl.
CPC ............. *H02J 50/80* (2016.02); *H02J 50/12* (2016.02); *H02J 50/40* (2016.02); *H04B 5/0031* (2013.01); *H04B 5/0037* (2013.01); *H04B 5/0075* (2013.01)

(58) Field of Classification Search
CPC .................................. H02J 50/00; H04B 5/00
USPC .......................................................... 307/104
See application file for complete search history.

(56) References Cited

U.S. PATENT DOCUMENTS

| | | | | |
|---|---|---|---|---|
| 10,657,563 | B2* | 5/2020 | Jung ................... | G06Q 30/0261 |
| 2015/0022018 | A1* | 1/2015 | Kim ........................ | H02J 7/025 |
| | | | | 307/104 |
| 2015/0133056 | A1* | 5/2015 | Kang ...................... | H02J 50/00 |
| | | | | 455/41.2 |
| 2015/0229135 | A1* | 8/2015 | Porat ....................... | H02J 50/90 |
| | | | | 307/104 |
| 2015/0256226 | A1* | 9/2015 | Lin ......................... | H02J 50/90 |
| | | | | 307/104 |
| 2015/0270740 | A1* | 9/2015 | Lee ......................... | H02J 50/40 |
| | | | | 320/108 |
| 2015/0372496 | A1* | 12/2015 | Lee ......................... | H02J 50/90 |
| | | | | 307/104 |

(Continued)

OTHER PUBLICATIONS

"A4WP Wireless Power Transfer System Baseline System Specification (BSS)", 3GPP2 Draft; Proposed A4WP BSS V1.1.2+(2013-1114+RES), 3rd Generation Partnership Project 2, 3GPP2, 2500 Wilson Boulevard, Suite 300, Arlington, Virginia 22201; USA, val. TSGAC Dec. 2, 2013 (Dec. 2, 2013), pp. 1-96.

(Continued)

*Primary Examiner* — Adi Amrany
(74) *Attorney, Agent, or Firm* — Eversheds Sutherland (US) LLP

(57) ABSTRACT

Embodiments relating to systems, methods, and devices for wireless charging are disclosed. In some embodiments, methods for establishing a communication link between a power transmitting unit (PTU) and a power receiving unit (PRU) through a low energy wireless communication interface are described.

25 Claims, 8 Drawing Sheets

System 200

(56) References Cited

U.S. PATENT DOCUMENTS

2016/0149601 A1* 5/2016 Lin .................. H04B 5/0037
307/104
2016/0172893 A1* 6/2016 Yoon .................. H04B 5/0031
320/108

OTHER PUBLICATIONS

First Exam Report for Indian Application No. 201647040909, dated May 8, 2020, 5 pages.
Office Action for Chinese Application No. 201580027471.4, dated May 6, 2020, 10 pages (6 English, 4 Chinese).

* cited by examiner

SYSTEMS, METHODS, AND DEVICES FOR WIRELESS CHARGING

CROSS REFERENCE TO RELATED APPLICATION

This application is a continuation of U.S. application Ser. No. 14/498,856, filed Sep. 26, 2014, which claims the benefit of U.S. provisional Patent Application No. 62/018,385, filed on Jun. 27, 2014, the disclosures of which is incorporated herein by reference in their entireties.

TECHNICAL FIELD

Embodiments described herein generally relate to transferring power between devices.

BACKGROUND

Wireless power transfer may include wirelessly or inductively transferring power via non-radiative, near-field magnetic resonance. In some examples, wireless power transfer may be defined as a resonant wireless transfer of power through magnetic induction between coils located at a power transmitting unit (PTU) and coils located at a power receiving unit (PRU). The transferred power received at the PRU may enable wireless charging of a battery for various types of portable devices such as headsets, smart phones, portable game or media players, game controllers, tablets, netbooks, notebooks, wearable computer devices, etc. However, when there are multiple PTUs and multiple PRUs in the same area, a problem called "cross connection" may arise. For example, two or more PTUs may try to wirelessly charge the same PRU at the same time. Namely there may be a possibility of a local PRU to connect to a PTU in a remote location by mistake due to inherent long range nature of BLE radio, and because the remote PTU grabs the PRU over the Bluetooth low energy (BLE) control channel.

DETAILED DESCRIPTION

Figure 1:
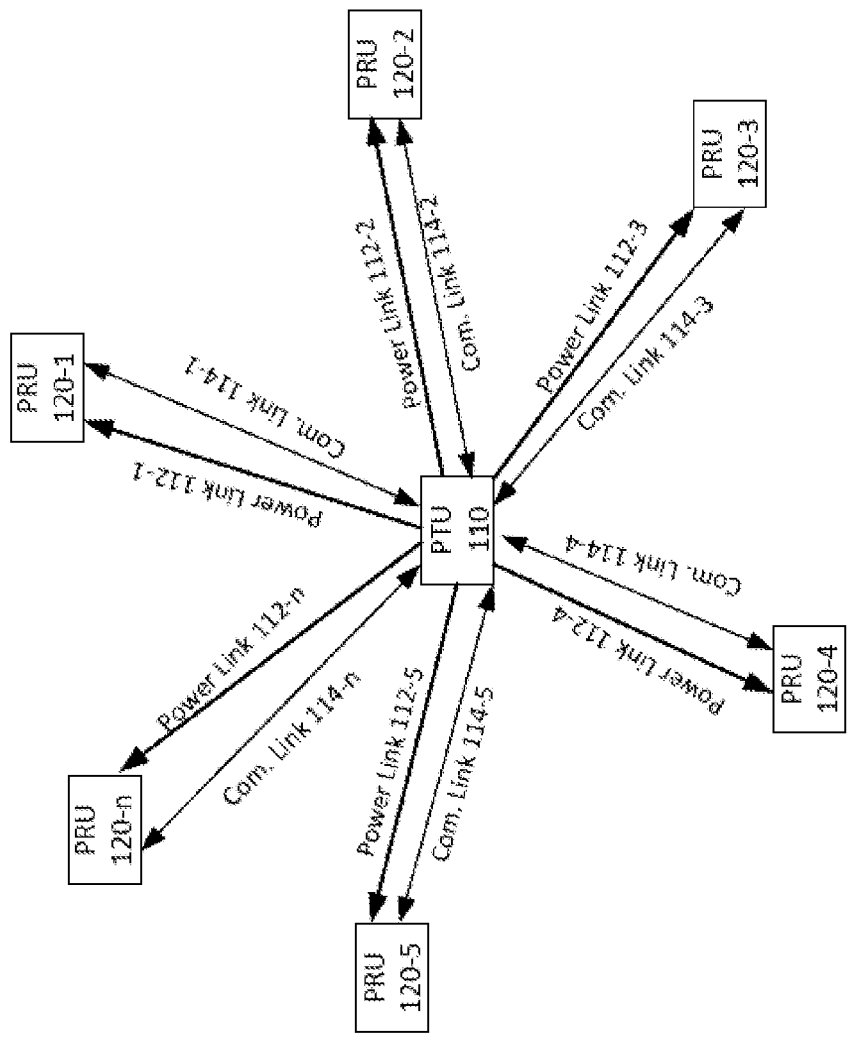
FIG. 1 illustrates an example of a wireless charging system, according to one example embodiment.

Embodiments presented herein are generally directed to systems, methods, and devices for wireless charging. Recent collaborative efforts to develop standards for wireless charging have led to multiple wireless charging standards such one approved by the Alliance for Wireless Power ("A4WP"). An example wireless standard approved by A4WP is "Version 1.0 Baseline System Specification (BSS)", published in January 2013 ("the A4WP standard"). The A4WP standard is based on impedance/load detection and use of Bluetooth® low energy (BLE) advertisements (ADVs). BLE ADVs may be generated by circuitry at a power receiving unit (PRU) in accordance both the A4WP standard and/or the Bluetooth Specification, Version 4.0, published in June 2010 and/or later versions or revisions ("the BLE standard"). Impedance/load detection and use of BLE ADVs according to the A4WP standard may determine a relationship (e.g., relative locations) between the PTU and one or more power receiving units (PRUs). Due to some inherent difficulties associated with impedance/load detection and BLE ADV received signal strength indicator (RSSI) fluctuation, it may be difficult to determine which PRU under charge is powered by the PTU. An occasional cross connect may occur that results in the PTU connecting to a remote PRU that may be within BLE ADV range but not physically located close enough for wireless charging. It is with respect to these and other challenges that the examples described herein are needed.

Embodiments of the present disclosure providen numerous technical effects and unobvious solutions over conventional solutions. For example, according to some embodiments, certain methods may be implemented at a PTU. For these embodiments, the PTU may be capable of inductively or wirelessly transferring power to one or more PRUs. The PTU may detect a first PRU based on use of a transmitted short beacon (e.g., a A4WP short power beacon) to detect an impedance or charging load associated with the first PRU. Also, for these examples, a long beacon (e.g., a A4WP long power beacon) may be transmitted that includes a modulated signature in the long beacon. The long beacon may cause the first PRU to energize a low energy wireless communication interface (e.g., a BLE interface). Also, for these examples, the energized low power interface (BLE) may transmit an advertisement (ADV) packet from the first PRU. A connection request may then be sent to establish a communication link with the first PRU through the low energy wireless communication link if the ADV packet includes a signature that matches the modulated signature. The PTU may transition to the next power state to keep powering the first PRU while maintaining the communication link.

According to some other embodiments, certain methods may be implemented at a PRU. For these other embodiments, the PRU may receive a long beacon (e.g., A4WP long power beacon) that includes a modulated signature that identifies a PTU capable of inductively or wirelessly transferring power to the PRU. A low energy wireless communication interface (e.g., BLE interface) may be energized responsive to receiving the long beacon. The modulated signature may be decoded and an ADV packet may be generated that includes the decoded signature. Also, for these other examples, the ADV packet may be transmitted, after which the PTU may establish a communication link with the PRU through the low energy wireless communication interface. The PTU may transition to the next power state for PRU to charge and maintain the communication link.

FIG. 1 illustrates an example system according to at least one embodiment. In some examples, the example system includes system 100. System 100, as shown in FIG. 1, includes a power transmit unit (PTU) 110 to interact with one or more power receive units (PRUs) 120-1 to 120-$n$, where "n" is any positive integer greater than 1. According to some examples, power links 112-1 to 112-$n$ and communication links 114-1 to 114-$n$ may allow for physical and functional interactions between PTU 110 and PRUs 120-1 to 120-$n$. The physical interaction may include PTU 110 wirelessly or inductively transferring power to any one of PRUs 120-1 to 120-*n* via respective power links 112-1 to 112-*n*. The functional interaction may occur over communication links 114-1 to 114-*n* and logic and/or features of PTU 110 or PRUs 120-1 to 120-*n* may be capable of conducting such functional interactions as session or power control management through lower power wireless communication interfaces over these communication links.

Figure 2:
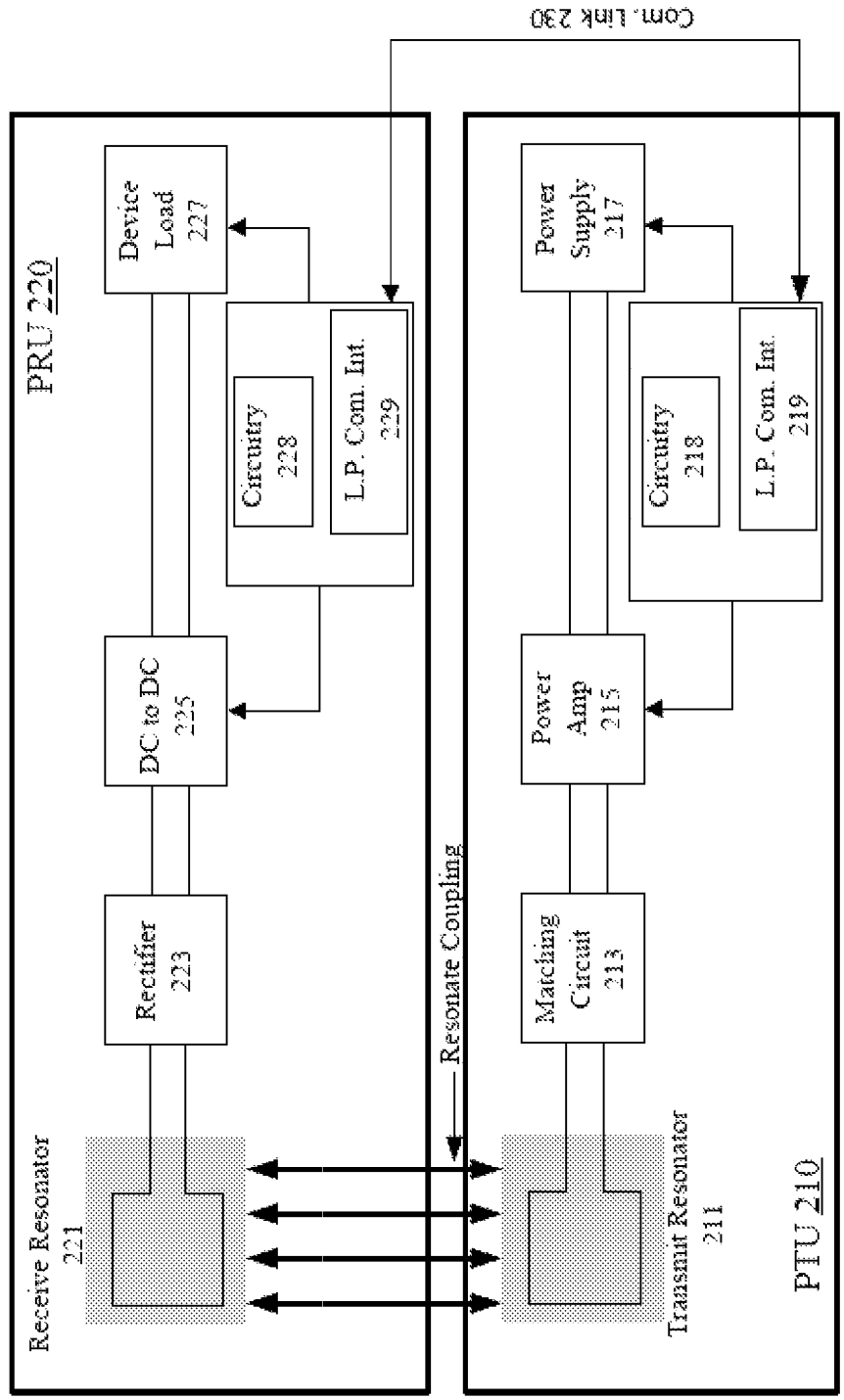
FIG. 2 illustrates an architecture of a wireless charging system, according to one example embodiment.

FIG. 2 illustrates another example system. In some embodiments, the example system includes system 200. System 200 as shown in FIG. 2 includes a PTU 210 and a PRU 220. According to some examples, PTU 210 and PRU 220 may be configured in compliance with one or more standards for wirelessly or inductively charging a device load such as the A4WP standard.

In some embodiments, as shown in FIG. 2, PTU 210 includes a transmit resonator 211, a matching circuit 213, a power amplifier 215, a power supply 217 or a lower power wireless communication interface 219. Also, as shown in FIG. 2, PRU 220 includes a receive resonator 221, a rectifier 223, a direct current (DC) to DC 225, a device load 227 or a lower power wireless communication interface 229. For these embodiments, transmit resonator 211 may be capable of wireless power transfer via resonate coupling to receive resonator 221 at an operating frequency in the industrial, scientific and medical (ISM) radio band that may include, but is not limited to, 6.78 megahertz (MHz). Power supply 217 may supply the power, power amp 215 may adjust the power to be provided and matching circuit 213 may match impedance to assist with the power transfer from transmit resonator 211. Also, for these embodiments, rectifier 223 may be used to convert the power received via receive resonator 221 from an alternating current (AC) to a direct current (DC), DC to DC 225 may assist in providing a DC load to device load 227.

According to some embodiments, control information to facilitate wireless power transfer may be exchanged between PTU 210 and PRU 220 over communication link 220. For these embodiments, lower power wireless communication interface 219 of PTU 210 and lower power wireless communication interface 229 of PRU 220 may be configured or arranged to be operate by logic or features of circuitry 218 and 228, respectively, according to the BLE standard. Circuitry 218 or 228 may be capable of sending packets through lower power wireless communication interfaces 219 or 229 and over communication link 230 using a management protocol according to the A4WP standard or the BLE standard. As described more below, this may include the use of BLE ADV and connection request packets.

Figure 3:
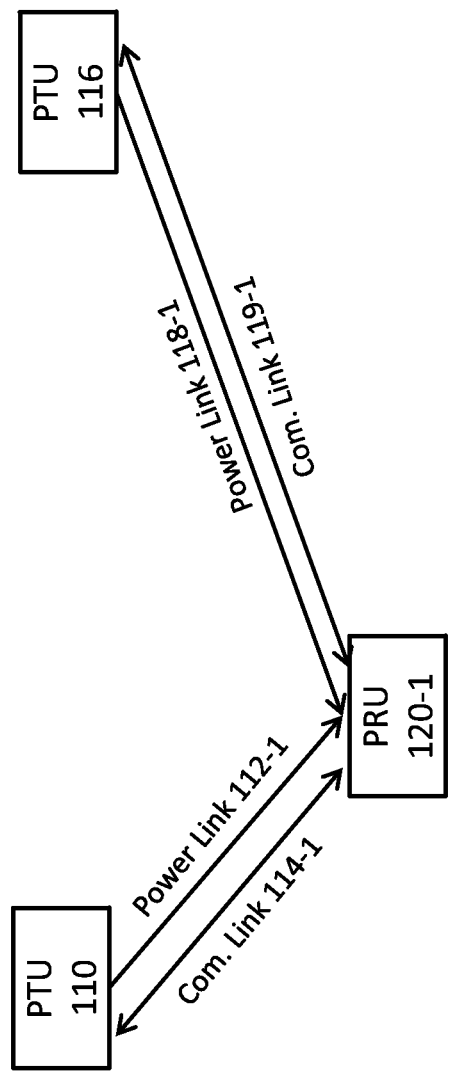
FIG. 3 illustrates an example of a wireless charging system, according to one example embodiment.

FIG. 3 illustrates a problem called "cross connection" that may arise when there are multiple PTUs and multiple PRUs in the same area. For example, as illustrated in FIG. 3, two or more PTUs 110, 116 may try to wirelessly charge the same PRU 120-1 at the same time. Namely there may be a possibility of a local PRU 120-1 to connect to a PTU 116 in a remote location by mistake due to inherent long range nature of BLE radio, and because the remote PTU 116 could grab the PRU 120-1 over the Bluetooth low energy (BLE) control channel. For example, remote PTU 116 can establish a connection with PRU 120-1 over communication link 119-1 merely due to the BLE. The power link 118-1 may not be able to power PRU 120-1. The result is that PTU 110 does not establish communication link 114-1 and turn off the power link 112-1, and PRU 120-1 does not receive any more power.

Figure 4:
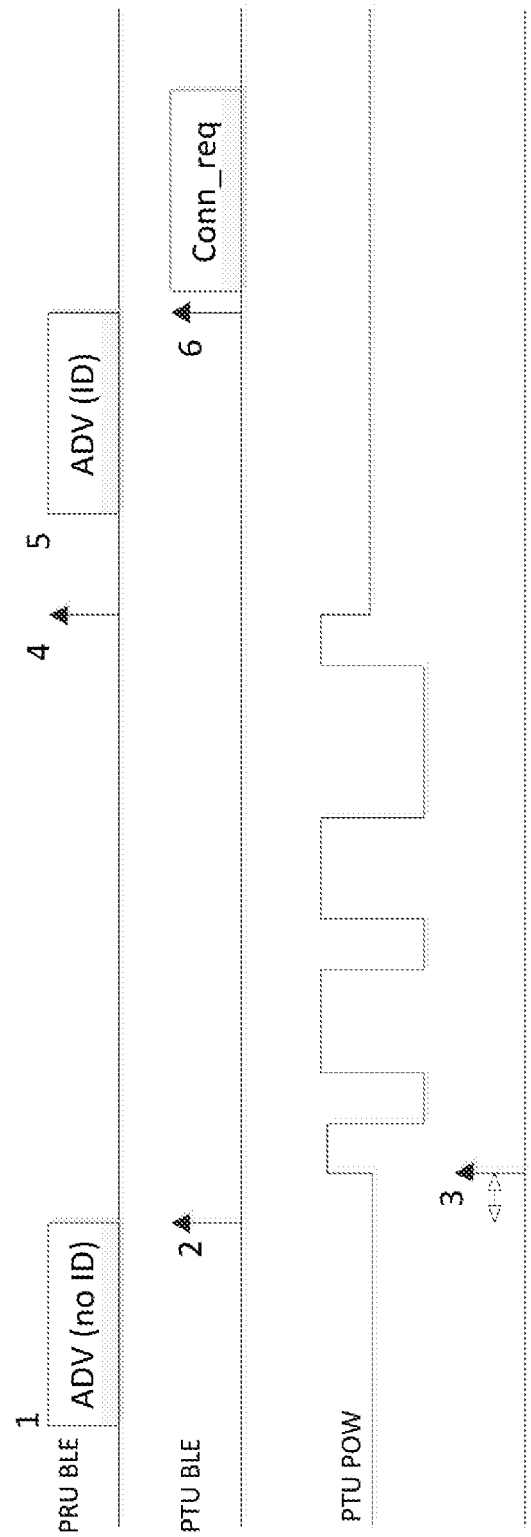
FIG. 4 illustrates the operation and timing of a PTU and PRU, according to one example embodiment.

Certain technical effects or solutions can be accomplished by certain embodiments of the disclosure, for example, certain embodiments of systems, methods, and devices described herein can provide for a forward signaling protocol and format for low cost, high efficiency, and robust implementation. One example embodiment is illustrated in FIG. 4, which illustrates one example of a wireless communication protocol between a PTU 110 and PRU 120-1. According to this example embodiment, the modulation may be initiated by the PTU 110 upon the detection of BLE advertisement (ADV) packets from PRU 120-1. The BLE ADV is sent by the PRU 120-1 that receives an initial, low charging power for setting up a BLE connection. The initial BLE ADV packet in FIG. 4 indicates that the PRU 120-1 supports forward signaling capability and no message about PTU ID is received. This is an indicator that PRU 120-1 is looking forward to connecting to a local PTU 110.

In the next operation, for example, the PTU 110 sends a message to the PRU 120-1 by modulating the power to the PRU 120-1. Namely, the message signal rides on the charging signal, for example. The message can include a sequence of information bits, for example. The message may also be encoded, for example. The encoder outputs a sequence of code bits. The encoder may be a convolutional encoder and the code bits may be further spread as in CDMA system, for example. In general, a sequence of information bits is mapped to a longer sequence of code bits for subsequent modulation.

After encoding/spreading, the modulation of the code bit sequence can be binary phase shift keying (BPSK), for example. The charging power received at the PRU 120-1 can fluctuate suddenly due to various reasons e.g., load change at PRU 120-1 or other PRU 120-*n* or supply change at PTU 110. The fluctuation can interfere with the BPSK reception. In order to enhance the detection reliability and to enhance reliability of the message, differential modulation may further be applied. For example, the BPSK modulated sequence can be 1, −1, −1, 1. The differentially modulated sequence can then be 1, 1, −1, 1, 1. This allows the receiver e.g., PRU 120-1 to detect the code bit sequence using the received power level of the previous code bit as reference. Since the message signal rides on the charging signal, the magnitude of the message signal is usually much smaller than that of the charging signal. For example, the magnitude of the message signal is typically about 5% or less of that of the charging signal. The modulation may typically be a fixed voltage swing, for example, 0.5V at all power levels.

Since the magnitude of the received message signal can be used to determine the distance/coupling between the PTUs and PRU 120-1 such that the PRU 120-1 can pick the closest PTU 110 for high charging efficiency, it is desirable the transmitted magnitude of the message signal be the same for all PTUs. The PRU 120-1 may receive multiple message signals from multiple PTUs and decode the strongest message for connecting to the closest PTU 110. This allows the PRU 120-1 to find the closest PTU 110 even if different PTU use different charging voltages. For detecting the message, the PRU 120-1 needs to know when the PTU 110 starts to send the message.

In certain embodiments, the timing of the PRU/PTU operations can be set by the advertisement (ADV) packet. The transmit/receive time of the modulated message may be aligned with the BLE timing. For example, there can be three BLE advertisement channels. The PRU 120-1 sends ADVs on all three advertisement channels sequentially. Therefore, the PTU 110 and the PRU 120-1 need to determine the actual start time of the modulated message from the ADV and the advertisement channel ID. For example, the BLE ADV may specify the start time of the message sent by the PTU 110. As another example, a transmission delay may be predefined for each advertisement channel. For example, if the ADV is received from channel 1, then the start time of message transmission is about 500 micro-seconds after the termination of the ADC on channel 1. As yet another example, the termination of advertisement event can be determined in BLE regardless of the advertisement channel used. Therefore, the termination time of the advertisement event can be used as a timing reference point.

After the first ADV packet in FIG. 4 is sent, the PRU 120-1 expects that the message will arrive within a time interval that can be determined. Similarly, the PTU 110 receives the ADV should send message as determined by ADV or/and advertisement channel ID or/and other parameters in the standard. The modulated signal is aligned with the ADV packet timing, for example, the modulation begins a fixed or known time after the reception of the ADV packet. This may enable the PRU 120-1 to detect and to time synchronize.

In the next operation, for example, the PRU 120-1 decodes the message and sends it by the next ADV packet in the ID field. If PTU 110 receives the next ADV packet with a matching ID to the message, it sends the connect_req and transitions to next A4WP power state, for example.

Figure 6:
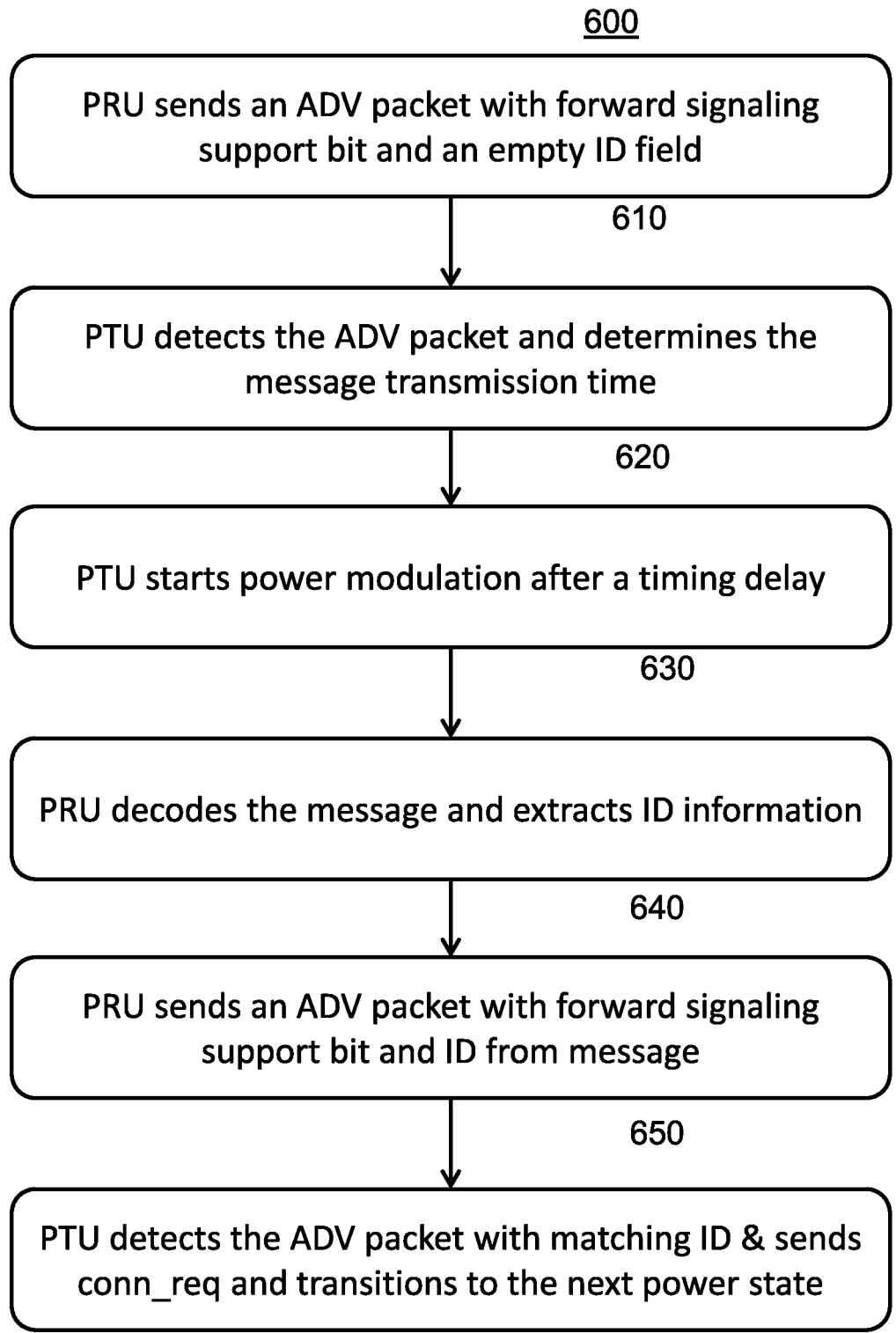
FIG. 6 illustrates an example of a logic flow, according to one example embodiment.

Turning now to FIG. 6, a method of wireless charging communication 600 is illustrated, according to one example embodiment. According to this method 600, in operation 610, the PRU 120-1 sends ADV with forward signaling support bit and empty ID field. In operation 620, the PTU 110 detects the ADV and determines the message transmission time according to the methods and systems described above. In operation 630, PTU 110 starts power modulation after a (fixed or varying) timing delay. Modulation can be a differential CDMA/convolutional code AM modulation, as described in the above embodiments. In operation 640, the PRU 120-1 can decode the message, for example, and in operation 650, the PRU 120-1 sends ADV (with forward signaling support bit) and ID extracted from the message received from the PTU 110. In operation 660, the PTU 110 detects the ADV with matching ID and sends a conn_req, and transitions to the next A4WP power state, for example.

Certain technical effects or solutions can be accomplished by certain embodiments of the disclosure, for example, certain example embodiments described herein may be that the combination of time sync with an external radio for inline power communication saves on signal design complexity. Differential signaling is robust against power line impairment. Additionally, CDMA or convolution coding/encoding is robust against noise and very simple to implement on the MCU.

Although example embodiments described herein involve two or more PTUs, and one or more PRUs, the methods and systems described herein can be applied any combination of PTUs and PRUs. Although the modulation of power in long beacon is discussed herein, the modulation may be applicable in power transfer state when continuous power transfer is happening, for example, when the PTU is already charging a PRU 120-1, and a new PRU 120-2 is placed on the PTU. It should be appreciated that the above examples of technical effects and/or solutions of the present disclosure are merely illustrative and that numerous other technical effects and/or advantages may exist.

Figure 5:
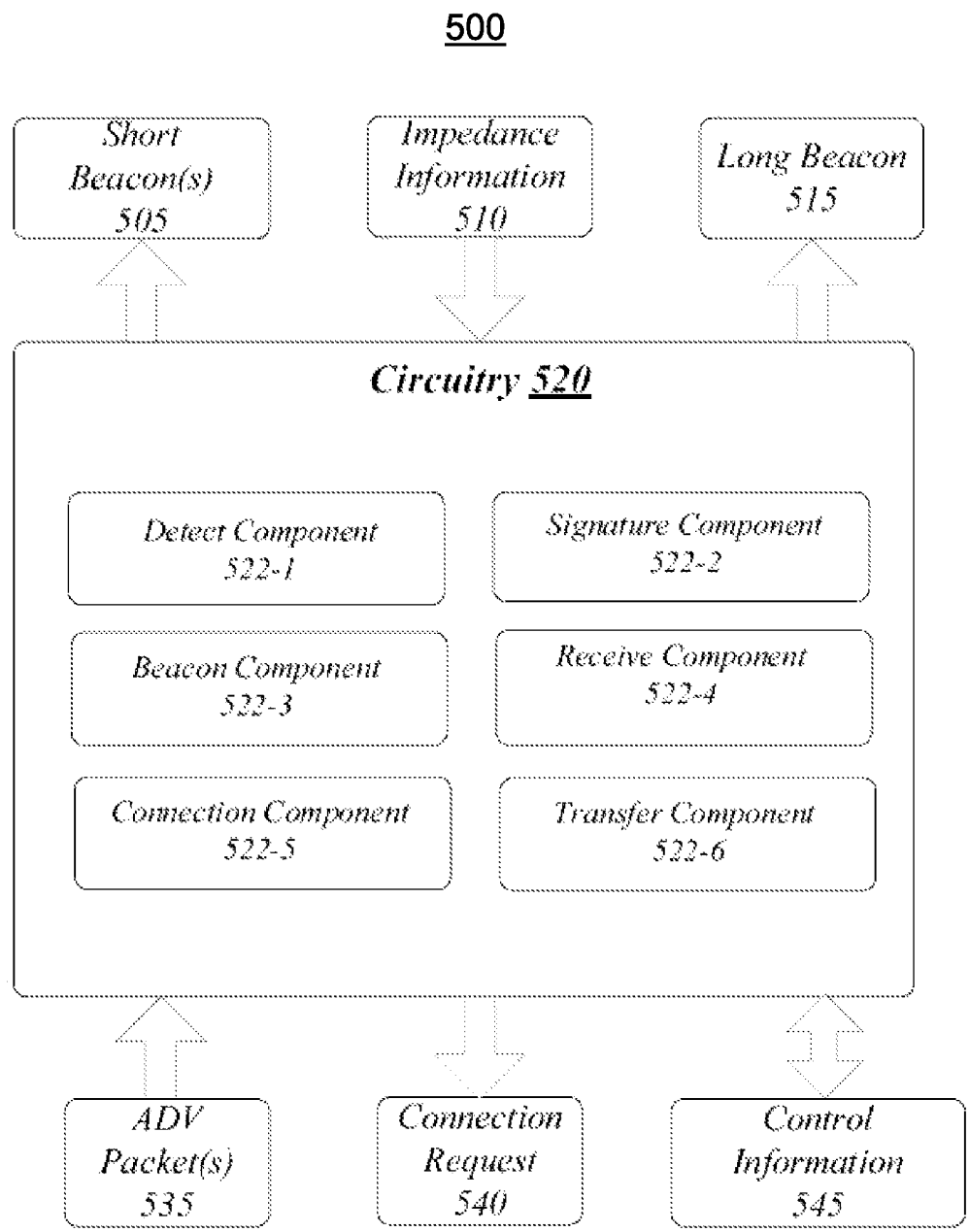
FIG. 5 illustrates an example block diagram for an apparatus, according to one example embodiment.

FIG. 5 illustrates a block diagram for an example apparatus, which may be any one of the PTUs or PRUs described above, according to at least one embodiment of the disclosure. As shown in FIG. 5, the apparatus includes an apparatus 500. Although apparatus 500 shown in FIG. 5 has a limited number of elements in a certain topology or configuration, it may be appreciated that apparatus 500 may include more or less elements in alternate configurations as desired for a given implementation.

The apparatus 500 may include a component of a PTU (e.g., PTU 110) that may be firmware implemented and have a circuitry 520 arranged to execute one or more components 522-*a*. It is worthy to note that "a" and "b" and "c" and similar designators as used herein are intended to be variables representing any positive integer. Thus, for example, if an implementation sets a value for a=6, then a complete set of components 522-*a* may include components 522-1, 522-2, 522-3, 522-4, 522-5 or 522-6. The examples are not limited in this context.

In some embodiments, as shown in FIG. 5, apparatus 500 includes circuitry 520. Circuitry 520 may be generally arranged to execute one or more components 522-*a*. Circuitry 520 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as circuitry 520. According to some examples circuitry 520 may also be an application specific integrated circuit (ASIC) and components 522-*a* may be implemented as hardware elements of the ASIC.

According to some embodiments, apparatus 500 may include a detect component 522-1. Detect component 522-1 may be executed by circuitry 520 to detect a first PRU based on use of a transmitted short beacon to detect an impedance or charging load associated with the first PRU. For these embodiments, the transmitted short beacon may be included in short beacon(s) 505 and detection may be included in impedance information 510.

In some embodiments, apparatus 500 may also include a signature component 522-2. Signature component 522-2 may be executed by circuitry 520 to generate a signature. For these embodiments, the signature may be randomly generated by signature component 522-2.

According to some embodiments, apparatus 500 may also include a beacon component 522-3. Beacon component 522-3 may be executed by circuitry 520 to transmit a long beacon that includes a modulated signature in the long beacon for the signature generated by signature component 522-2. The long beacon may cause the first PRU to energize a low energy wireless communication interface (e.g., BLE interface). For these embodiments, the long beacon may be included in long beacon 515.

In some embodiments, apparatus 500 may include a receive component 522-4. Receive component 522-4 may be executed by circuitry to receive an ADV packet from the first PRU. For these embodiments, the ADV packet may have been included in ADV packet(s) 535.

According to some embodiments, apparatus 500 may include a connection component 522-5. Connection component 522-5 may be executed by circuitry 520 to send a connection request to establish a communication link with the first PRU through the low energy wireless communication interface if the ADV packet includes a signature that matches the modulated signature. For these embodiments, the connection request may be included in connection request 540.

In some embodiments, apparatus 500 may include a transfer component 522-6. Transfer component 522-6 may be executed by circuitry to cause power to be transferred to the first PRU while maintaining the communication link. For these embodiments, control information 545 may include management or control information to facilitate wireless or inductive power transfer to the first PRU.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 7:
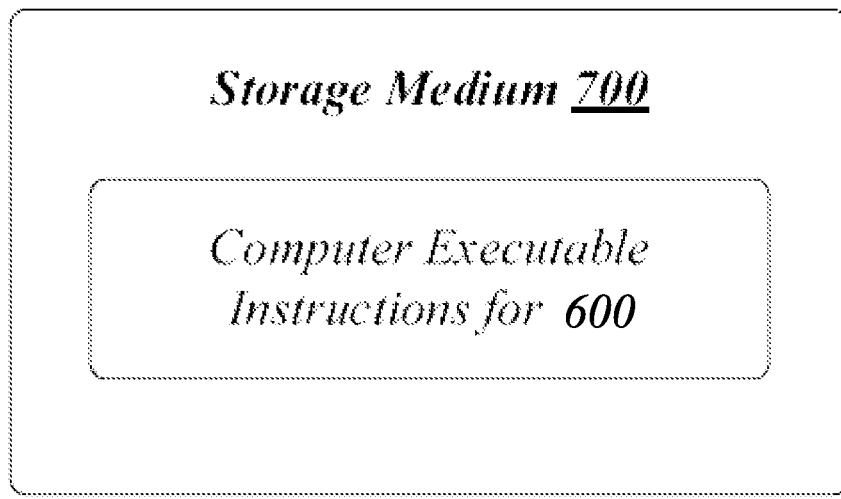
FIG. 7 illustrates an example of a storage medium, according to one example embodiment.

FIG. 7 illustrates an embodiment of an example storage medium, which may be embedded in a component of PTU (e.g., PTU 110) or a component of a PRU (e.g., 120-1), according to at least one embodiment of the disclosure. As shown in FIG. 7, the storage medium includes a storage medium 700. Storage medium 700 may include an article of manufacture. In some embodiments, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
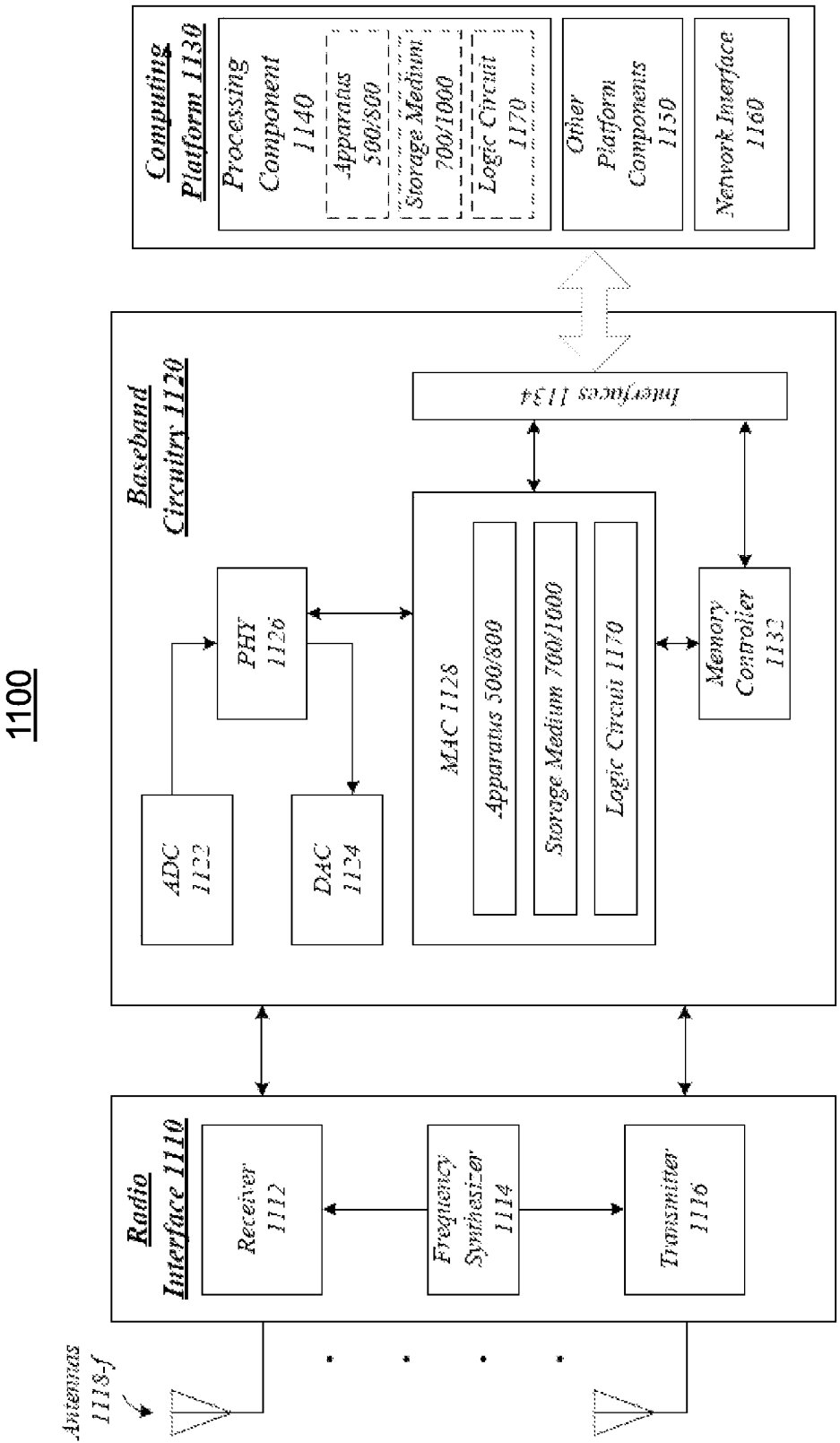
FIG. 8 illustrates an example of a device, according to one example embodiment.

FIG. 8 illustrates an embodiment of a device 1100. In some embodiments, device 1100 may be configured or arranged for either providing power or receiving power via wireless or inductive power transfer. Device 1100 may implement, for example, apparatus 500/800, storage medium 700/1000 and/or a logic circuit 1170. The logic circuit 1170 may include physical circuits to perform operations described for apparatus 500/800. As shown in FIG. 8, device 1100 may include a radio interface 1110, baseband circuitry 1120, and computing platform 1130, although embodiments are not limited to this configuration.

The device 1100 may implement some or all of the structure and/or operations for apparatus 500/800, storage medium 700/1000 and/or logic circuit 1170 in a single computing entity, such as entirely within a single device. The embodiments are not limited in this context.

Radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118-*f*. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1126 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with MAC processing circuit 1128 and/or a computing platform 1130, for example, via one or more interfaces 1134.

In some embodiments, PHY processing circuit 1126 may include a frame construction and/or detection component, in combination with additional circuitry such as a buffer memory, to construct and/or deconstruct communication frames (e.g., containing subframes). Alternatively or in addition, MAC processing circuit 1128 may share processing for certain of these functions or perform these processes independent of PHY processing circuit 1126. In some embodiments, MAC and PHY processing may be integrated into a single circuit.

Computing platform 1130 may provide computing functionality for device 1100. As shown, computing platform 1130 may include a processing component 1140. In addition to, or alternatively of, baseband circuitry 1120 of device 1100 may execute processing operations or logic for apparatus 500/800, storage medium 700/1000, and logic circuit 1170 using the processing component 1140. Processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), double-data-rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as redundant array of independent disks (RAID) drives, solid state memory devices (e.g., USB memory, solid state drives (SSD) and any other type of storage media suitable for storing information.

Computing platform 1130 may further include a network interface 1160. In some embodiments network interface 1160 may include logic and/or features to support network interfaces operated in compliance with one or more wireless or wired technologies such as those described above for establishing a communication link through a low power wireless communication interface.

Device 1100 may include a PTU or a PRU and may be, for example, user equipment, a computer, a personal computer (PC), a desktop computer, a laptop computer, a notebook computer, a netbook computer, a tablet computer, an ultra-book computer, a smart phone, a wearable computing device, embedded electronics, a gaming console. Accordingly, functions and/or specific configurations of device 1100 described herein, may be included or omitted in various embodiments of device 1100, as suitably desired.

Embodiments of device 1100 may be implemented using single input single output (SISO) architectures. However, certain implementations may include multiple antennas (e.g., antennas 1118-*f*) for transmission and/or reception using adaptive antenna techniques for beamforming or spatial division multiple access (SDMA) and/or using multiple input multiple output (MIMO) communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example device 1100 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the disclosure is provided will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

EXAMPLES

One example may be an apparatus including circuitry for a power transmitting unit (PTU) capable of inductively or wirelessly transferring power to one or more power receiving units (PRUs), a receiving component for execution by the circuitry to receive an advertisement (ADV) packet with a forward signaling support bit and an empty ID field from a first PRU, a detecting component for detecting the ADV and determining a message transmission time, a modulation component for starting a power modulation after a predetermined timing delay, and a transmitting component for transmitting an encoded message to the first PRU, wherein the receiving component receives an ADV with forward signaling support bit and an ID extracted from the first PRU, and the detecting component detects the ADV with a matching ID and sends a connection request to the first PRU. The message may be modulated using binary phase shift keying (BPSK). The message may be further modulated using differential modulation or differential CDMA/convolutional code modulation. A magnitude of the message may be about 10% or less than that of a charging signal. The modulation may be a fixed voltage swing.

Another example may be a method of communication between a power transmitting unit (PTU) capable of inductively or wirelessly transferring power to one or more power receiving units (PRUs), the method including the steps of a first PRU sending an advertisement packet (ADV) with a forward signaling support bit and an empty ID field, a first PTU detecting the ADV and determining a message transmission time, the first PTU starting a power modulation after a predetermined timing delay, the first PRU decoding a message sent by the first PTU, the first PRU sending an ADV with forward signaling support bit and an ID extracted from the message, and the first PTU detecting the ADV with a matching ID and sending a connection request to the first PRU. The message may be modulated using binary phase shift keying (BPSK). The message may be further modulated using differential modulation or differential CDMA/convolutional code modulation. A magnitude of the message may be about 10% or less than that of a charging signal. The modulation may be a fixed voltage swing.

Another example may be a machine readable medium including a plurality of instructions that in response to being executed by circuitry for a power transmitting unit (PTU) capable of inductively or wirelessly transferring power to one or more power receiving units (PRUs) causes the circuitry to receive an advertisement (ADV) packet with a forward signaling support bit and an empty ID field from a first PRU, detecting the ADV and determining a message transmission time, starting a power modulation after a predetermined timing delay, and transmitting an encoded message to the first PRU, receiving an ADV with forward signaling support bit and an ID extracted from the first PRU, and detecting the ADV with a matching ID for sending a connection request to the first PRU. The message may be modulated using binary phase shift keying (BPSK). The message may be further modulated using differential modulation or differential CDMA/convolutional code modulation. A magnitude of the message may be about 10% or less than that of a charging signal. The modulation may be a fixed voltage swing.

Another example may be an apparatus including circuitry for a power receiving unit (PRU) to inductively or wirelessly receive power from a power transmitting unit (PTU), a sending component for execution by the circuitry to send an advertisement (ADV) packet with a forward signaling support bit and an empty ID field to a PTU, a receiving component for receiving an encoded message from the PTU, wherein the sending component sends an ADV with forward signaling support bit and an ID extracted from the message, and the PTU detects the ADV with a matching ID and sends a connection request to the PRU. The message may be modulated by the PTU using binary phase shift keying (BPSK). The message may be further modulated by the PTU using differential modulation or differential CDMA/convolutional code modulation. A magnitude of the message may be about 10% or less than that of a charging signal. The modulation may be a fixed voltage swing.

Another example may be a machine readable medium including a plurality of instructions that in response to being executed by circuitry for a power receiving unit (PRU) causes the circuitry to send an advertisement (ADV) packet with a forward signaling support bit and an empty ID field to a power transmitting unit (PTU), receive an encoded message from the PTU, decode the encoded message and extract an ID in the encoded message, and send an ADV with forward signaling support bit and an ID extracted from the message, wherein the PTU detects the ADV with a matching ID and sends a connection request to the PRU. The message may be modulated by the PTU using binary phase shift keying (BPSK). The message may be further modulated by the PTU using differential modulation or differential CDMA/convolutional code modulation. A magnitude of the message may be about 10% or less than that of a charging signal. The modulation may be a fixed voltage swing.

What is claimed is:

1. A power receiving unit (PRU), the device comprising processing circuitry coupled to storage, the processing circuitry configured to:
    identify a short beacon received from a power transmitting unit (PTU), the short beacon is to detect a first variation in load;
    identify a long beacon received from the PTU, wherein the long beacon is based on the first variation in the load;
    cause to send a first advertisement (ADV) packet to the PTU based on the long beacon, wherein the first ADV packet comprises an empty identifier;
    identify a first message received from the PTU, wherein the first message comprises identification (ID) information associated with the PTU;
    cause to send a second ADV packet to the PTU, after receiving the first message, wherein the second ADV packet comprises the identification (ID) information; and
    receive power from the PTU, wherein the PTU sends power based on receiving the second ADV packet.

2. The PRU of claim 1, wherein the processing circuitry is further configured to identify a connection request received from the PTU after sending the second ADV packet to the PTU.

3. The PRU of claim 1, wherein the first ADV packet indicates that the PRU is looking to connect to the PTU.

4. The PRU of claim 1, wherein the processing circuitry is further configured to cause to transition to a first power state, to receive the power from the PTU, responsive to a timing delay after the second ADV packet is sent.

5. The PRU of claim 1, wherein the long beacon is initiated when a load variation is detected during the short beacon.

6. The PRU of claim 1, wherein the first ADV packet is sent to the PTU using a low power communication interface.

7. The PRU of claim 6, wherein the low power communication interface comprises a Bluetooth Low Energy (BLE) interface.

8. The PRU of claim 6, wherein the processing circuitry is further configured to power-up the low power communication interface using the power received through the long beacon.

9. A non-transitory computer-readable medium storing computer-executable instructions which when executed by one or more processors result in performing operations comprising:
    identifying a short beacon received from a power transmitting unit (PTU), the short beacon is to detect a first variation in load;

identifying a long beacon received from the PTU, wherein the long beacon is based on the first variation in the load;

causing to send a first advertisement (ADV) packet to the PTU based on the long beacon, wherein the first ADV packet comprises an empty identifier;

identifying a first message received from the PTU, wherein the first message comprises identification (ID) information associated with the PTU;

causing to send a second ADV packet to the PTU, after receiving the first message, wherein the second ADV packet comprises the identification (ID) information; and receiving power from the PTU, wherein the PTU sends power based on receiving the second ADV packet.

10. The non-transitory computer-readable medium of claim 9, wherein the operations further comprise identify a connection request received from the PTU after sending the second ADV packet to the PTU.

11. The non-transitory computer-readable medium of claim 9, wherein the first ADV packet indicates that the PRU is looking to connect to the PTU.

12. The non-transitory computer-readable medium of claim 9, wherein the operations further comprise causing to transition to a first power state, to receive the power from the PTU, responsive to a timing delay after the second ADV packet is sent.

13. The non-transitory computer-readable medium of claim 9, wherein the long beacon is initiated when a load variation is detected during the short beacon.

14. The non-transitory computer-readable medium of claim 9, wherein the first ADV packet is sent to the PTU using a low power communication interface.

15. The non-transitory computer-readable medium of claim 14, wherein the low power communication interface comprises a Bluetooth Low Energy (BLE) interface.

16. The non-transitory computer-readable medium of claim 14, wherein the operations further comprise power-up the low power communication interface using the power received through the long beacon.

17. A method comprising:
identifying, by one or more processors, a short beacon received from a power transmitting unit (PTU), the short beacon is to detect a first variation in load;

identifying a long beacon received from the PTU, wherein the long beacon is based on the first variation in the load;

causing to send a first advertisement (ADV) packet to the PTU based on the long beacon, wherein the first ADV packet comprises an empty identifier;

identifying a first message received from the PTU, wherein the first message comprises identification (ID) information associated with the PTU;

causing to send a second ADV packet to the PTU, after receiving the first message, wherein the second ADV packet comprises the identification (ID) information; and receiving power from the PTU, wherein the PTU sends power based on receiving the second ADV packet.

18. The method of claim 17, further comprising identifying a connection request received from the PTU after sending the second ADV packet to the PTU.

19. The method of claim 17, wherein the first ADV packet indicates that the PRU is looking to connect to the PTU.

20. A power transmitting unit (PTU), the device comprising processing circuitry coupled to storage, the processing circuitry configured to:
transmit a short beacon to a power receiving unit (PRU), the short beacon is to detect a first variation in load;

transmit a long beacon to the PRU, wherein the long beacon is based on the first variation in the load;

identify a first advertisement (ADV) packet received from the PRU based on the long beacon, wherein the first ADV packet comprises an empty identifier;

transmit a first message to the PRU, wherein the first message comprises identification (ID) information associated with the PTU;

identify a second ADV packet received from the PRU, after transmitting the first message to the PRU, wherein the second ADV packet comprises the identification (ID) information; and send charging power to the PRU based on receiving the second ADV packet.

21. The PTU of claim 20, wherein the processing circuitry is further configured to transmit a connection request to the PRU after receiving the second ADV packet from the PRU.

22. The PTU of claim 20, wherein the first ADV packet indicates that the PRU is looking to connect to the PTU.

23. The PTU of claim 20, wherein the PRU transitions to a first power state, to receive the power from the PTU, responsive to a timing delay after the second ADV packet is received by the PTU.

24. The PTU of claim 20, wherein the long beacon is initiated when a load variation is detected during the short beacon.

25. The PTU of claim 20, wherein the first ADV packet is sent using a low power communication interface.

* * * * *